(12) United States Patent
Yoshino et al.

(10) Patent No.: US 7,103,022 B2
(45) Date of Patent: Sep. 5, 2006

(54) COMMUNICATION CONTROL METHOD AND APPARATUS IN MOBILE COMMUNICATION SYSTEM

(75) Inventors: Hitoshi Yoshino, Yokosuka (JP); Toru Otsu, Yokohama (JP); Masaharu Hata, Okayama (JP)

(73) Assignee: NTT DoCoMo, Inc., Tokyo (JP)

( * ) Notice: Subject to any disclaimer, the term of this patent is extended or adjusted under 35 U.S.C. 154(b) by 964 days.

(21) Appl. No.: 10/073,317

(22) Filed: Feb. 13, 2002

(65) Prior Publication Data

US 2002/0115474 A1 Aug. 22, 2002

(30) Foreign Application Priority Data

Feb. 14, 2001 (JP) ............... 2001-037588

(51) Int. Cl.
*H04Q 7/00* (2006.01)
*H04B 7/212* (2006.01)
*H04J 4/00* (2006.01)

(52) U.S. Cl. .............. 370/330; 310/337; 310/478
(58) Field of Classification Search ........ 370/328–331, 370/336–337, 350, 478
See application file for complete search history.

(56) References Cited

U.S. PATENT DOCUMENTS 4,513,412 A 4/1985 Cox 5,095,535 A 3/1992 Freeburg
6,266,330 B1 * 7/2001 Jokinen et al. ............. 370/329

FOREIGN PATENT DOCUMENTS

| EP | 0 841 826 | 5/1998 |
|---|---|---|
| EP | 0 963 129 | 12/1999 |
| JP | 4-500589 | 1/1992 |
| JP | 10-155181 | 6/1998 |
| JP | 10-248086 | 9/1998 |
| JP | 11-346390 | 12/1999 |
| JP | 2000-59287 | 2/2000 |
| JP | 2000-59291 | 2/2000 |
| WO | WO 90/03071 | 3/1990 |
| WO | WO 99/14871 | 3/1999 |

* cited by examiner

*Primary Examiner*—Chi Pham
*Assistant Examiner*—Ronald Abelson
(74) *Attorney, Agent, or Firm*—Oblon, Spivak, McClelland, Maier & Neustadt, P.C.

(57) ABSTRACT

A communication control method used in a cellular mobile communication system in which each base station can radiate radio wave beams to a plurality of directions and each base station communicates with mobile stations by using the same frequency is provided in which the method includes the step of: controlling first timing at which a base station radiates a first radio wave beam such that the first timing is different from second timing at which another base station radiates a second radio wave beam which may cause interference with the first radio wave beam.

15 Claims, 15 Drawing Sheets

FIG.7

| ADJACENT BS | | 2O1 | | | | 2O2 | | | | 2O3 | | | | 2O4 | | | | 2O5 | | | | 2O6 | | | |
|---|---|---|---|---|---|---|---|---|---|---|---|---|---|---|---|---|---|---|---|---|---|---|---|---|---|
| BS 2Oo | BS No. BEAM DIRECTION | 30 | 180 | 210 | 240 | 90 | 240 | 270 | 300 | 150 | 300 | 330 | 0 | 210 | 0 | 30 | 60 | 270 | 60 | 90 | 120 | 330 | 120 | 150 | 180 |
| | 0° | | | | S5 | | | | | | | | | | | | | | | | | | | | |
| | 30° | S3 | | S2,S6 | | | | | | | | | | | | | | | | | | | S1 | | |
| | 60° | | S4,S5 | | | | | | | | | | | | | | | | | | | | | | |
| | 90° | | | | | S5 | | | | | | | | | | | | | | | | | | | |
| | 120° | | | | | | S1 | | | | | | | | | | | | | | | | | | |
| | 150° | | | | | | | S2 | | | S6 | | | | | | | | | | | | | | |
| | 180° | | | | | | | | S2 | | | S1 | | | | | | | | | | | | | |
| | 210° | | | | | | | | | | | S3 | S8 | | | | | | | | | | | | |
| | 240° | | | | | | | | | | | | | Sk,Sj | Sl | Sl,Sm | | | | | | | | | |
| | 270° | | | | | | | | | | | | | | Sl | | Sl | Sk | | Sl | Sm | | | | |
| | 300° | | | | | | | | | | | | | | | | | | | | | Sm | | | |
| | 330° | | | | | | | | | | | | | | | | | | | | | | Sj | | |

FIG.12A

| ADJACENT BS | BS No. | 20₆ | 20₁ | 20₂ | 20₃ |
|---|---|---|---|---|---|
| BS 20₀ (F1) | BEAM DIRECTION | 120° | 30° | 90° | 0° |
| | 0° | S4 | | | |
| | 30° | | S2 | | |
| | 90° | | | S4,S6 | |
| | 120° | | | | S1 |

FIG.12B

| ADJACENT BS | BS No. | 20₂ | 20₃ | 20₄ | 20₅ |
|---|---|---|---|---|---|
| BS 20₀ (F2) | BEAM DIRECTION | 240° | 150° | 210° | 120° |
| | 120° | S2 | | | |
| | 150° | | S3 | | |
| | 210° | | | S1,S5 | |
| | 240° | | | | S1,S6 |

FIG.12C

| ADJACENT BS | BS No. | 20₄ | 20₅ | 20₆ | 20₁ |
|---|---|---|---|---|---|
| BS 20₀ (F3) | BEAM DIRECTION | 0° | 270° | 330° | 240° |
| | 240° | S3 | | | |
| | 270° | | S3,S6 | | |
| | 330° | | | S2 | |
| | 360(0)° | | | | S5 |

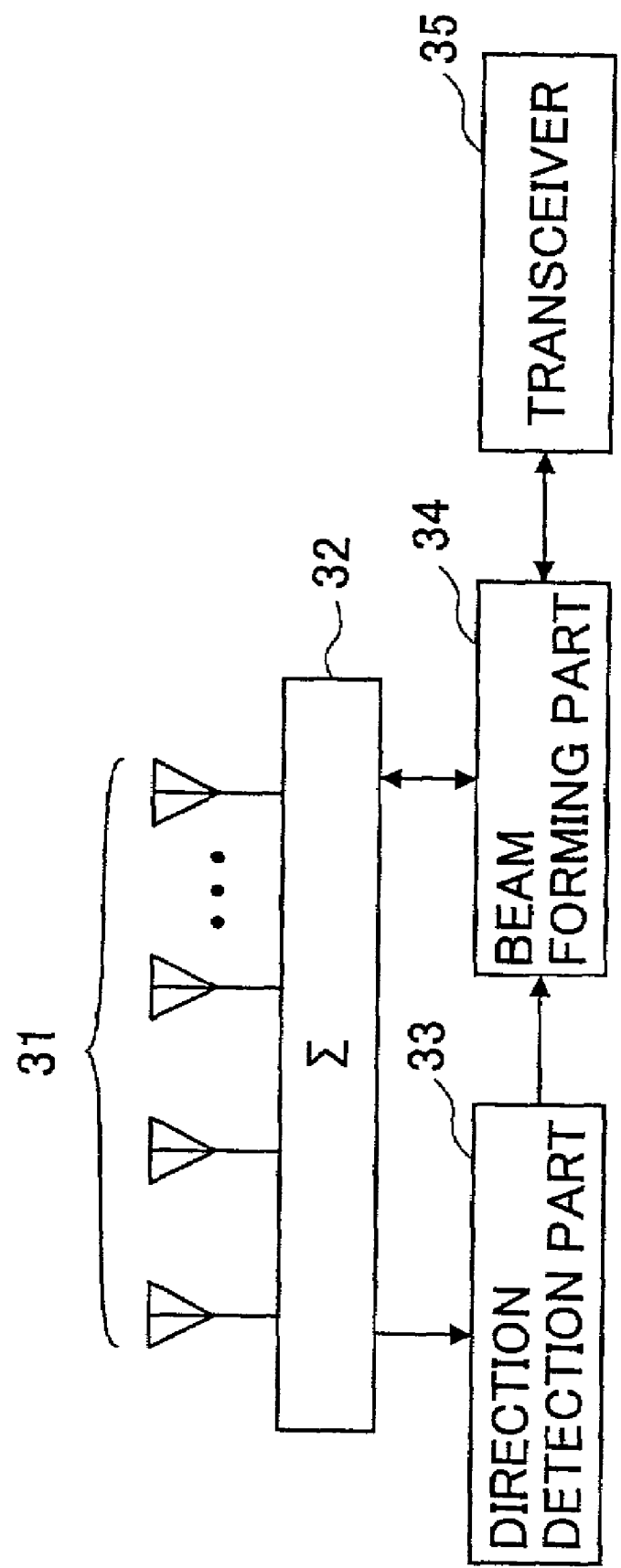

COMMUNICATION CONTROL METHOD AND APPARATUS IN MOBILE COMMUNICATION SYSTEM

BACKGROUND OF THE INVENTION

1. Field of the Invention

The present invention relates to a communication control method and the apparatus in a mobile communication system. More particularly, the present invention relates to a communication control method used for controlling communication between base stations and mobile stations on the basis of SDMA: Space Division Multiple Access in a mobile communication system.

2. Description of the Related Art

Conventionally, a communication control method of space division multiple access (which will be called SDMA hereinafter) is proposed. When adopting SDMA as a communication control method between the base station and the mobile station in a mobile communication system using cellular system, as shown in FIG. 1 for example, each of base stations $20_1$, $20_2$, $20_3$ which control communication areas (cells) E1, E2, E3 respectively forms a radio wave beam B which extends to a direction where the mobile station exists instead of radiating radio wave which covers the whole communication area for communicating with the mobile station.

In the cellular mobile communication system in which communication control between the base station and the mobile station is performed according to the communication control method of SDMA, when directions from the base station to the mobile stations are different, directions of radio wave beams B which are formed are different. Therefore, it becomes possible to perform communication in adjacent areas by using the same frequency so that it can be expected that frequency use efficiency in the directions of horizontal plane improves.

However, as the number of the mobile stations residing in a communication area of each base station increases, cases where radio wave beams are formed in the same direction or in the opposite direction in a plurality of adjacent areas in the same timing or cases where radio wave beams formed to a plurality of mobile stations from the base station overlap increase so that the radio wave beams interact each other as interference waves.

SUMMARY OF THE INVENTION

An object of the present invention is to provide a communication, control method and apparatus based on SDMA which can decrease interference due to radio wave beams radiated from each base station to a mobile station in a mobile communication system.

The above object is achieved by a communication control method used in a cellular mobile communication system in which each base station can radiate radio wave beams to a plurality of directions and each base station communicates with mobile stations by using the same frequency by radiating radio wave beams to the mobile stations, the method comprising the steps of:

controlling first timing at which a base station radiates a first radio wave beam such that the first timing is different from second timing at which another base station radiates a second radio wave beam which may cause interference with the first radio wave beam.

According to the communication control method, the timing at which each base station radiates radio wave beam is controlled such that the timing is different from timing at which other base stations radiates radio wave beams which may cause interference with the radio wave beam. Thus, it can be avoided that a plurality of base stations simultaneously radiates radio wave beams in the directions which may cause interference.

In the communication control method, the method may include the steps of:

predetermining other base stations for which interference caused by radio wave beams radiated by a base station should be considered;

notifying the base station of directions and radiation timing of radio wave beams radiated by the other base stations;

controlling the base station on the basis of the directions and radiation timing such that timing at which the base station radiates radio wave beams is different from timing at which the other base stations radiate radio wave beams which may cause interference with radio wave beams radiated by the base station.

From the viewpoint of considering base stations which are largely effected by interference caused by radio wave beams radiated by a base station, in the communication control method, the each of other base stations is an adjacent base station to the base station.

From the viewpoint of enabling handover by a mobile station, in the communication control method, the method includes the step of:

when a base station which communicates with a mobile station switches a radiating radio wave beam from a first radio wave beam to a second radio wave beam as the mobile station moves, controlling the base station such that timing at which the first radio wave beam is radiated is different from timing at which the second radio wave beam is radiated.

From the viewpoint of using frequency more efficiently when a radio wave beam radiated by a base station covers a plurality of mobile stations, in the communication control method, the method includes the step of:

when a radio wave beam which is radiated by a base station covers a plurality of mobile stations, controlling the base station such that timing at which the radio wave beam is radiated is different for each mobile station.

In the communication control method, the method includes the step of:

controlling timing of a radio wave beam at which a base station radiates such that the radio wave beam is radiated for a mobile station in a plurality of time slots at predetermined intervals.

The time slots can be defined by time slots which form a time frame for example.

From the viewpoint of controlling communication amount for the mobile station according to communication state in each base station, in the communication control method, the number of the time slots is determined on the bases of communication state in the base station.

The communication state in the base station may be communication state of each mobile station (communication amount for a mobile station) or may be comprehensive communication state in the base station (traffic state).

From the viewpoint of improving reliability of communication, in the communication control method, the method includes the steps of:

when a received level in a mobile station for a signal by a radio wave beam come from a base station directly is lowered, the mobile station directing a radio wave beam to a direction from which another radio wave beam comes, the another radio wave beam having the best receiving quality among other radio wave beams arriving at the mobile station from the base station, and the mobile station requesting allocation of a time slot for the another radio wave beam; and the base station allocating the time slot such that the time slot is different from timing at which other base stations radiate radio wave beams which may cause interference with the another radio wave beam.

According to this invention, the problem caused by narrowing the beam can be solved and communication path having few interference can be kept.

From the viewpoint of keeping good quality communication by solving a problem due to narrowing beam, in the communication control method, the method includes the steps of:

a mobile station receiving a signal by a first radio wave beam from a direction of a base station, the mobile station directing a radio wave beam to a direction from which a second radio wave beam comes, the second radio wave beam being radiated by the base station and arriving at the mobile station;

the mobile station requesting allocation of a time slot for the second radio wave beam;

the base station allocating the time slot such that the time slot is different from timing at which other base stations radiate radio wave beams which may cause interference with the second radio wave beam; and the mobile station combining a received signal by the first radio wave beam and a received signal by the second radio wave beam.

From the viewpoint of keeping communication path having few interference in the base station side, in the communication control method, the method includes the steps of:

when a received level in a base station for a signal by a radio wave beam come from direction of a mobile station is lowered, the base station directing a radio wave beam to a direction from which another radio wave beam comes to keep a path, the another radio wave beam having the best receiving quality among other radio wave beams arriving at the base station from the mobile station.

From the viewpoint of improving reliability of communication when the mobile station has non-directional antenna instead of a directional antenna, in the communication control method, the method includes the steps of:

when a received level in a mobile station for a signal by a radio wave beam come from a base station directly is lowered, the mobile station selecting another radio wave beam, the another radio wave beam having the best receiving quality among other radio wave beams arriving at the mobile station from the base station, and the mobile station requesting allocation of a time slot for the another radio wave beam; and the base station allocating the time slot such that the time slot is different from timing at which other base stations radiate radio wave beams which may cause interference with the another radio wave beam.

From the viewpoint of keeping good quality communication when the mobile station has non-directional antenna instead of a directional antenna, in the communication control method, the method includes the steps of:

a mobile station receiving a signal by a first radio wave beam from a direction of a base station, the mobile station requesting allocation of a time slot for a second radio wave beam, the second radio wave beam being radiated by the base station and arriving at the mobile station;

the base station allocating the time slot such that the time slot is different from timing at which other base stations radiate radio wave beams which may cause interference with the second radio wave beam; and the mobile station combining a received signal by the first radio wave beam and a received signal by the second radio wave beam.

The above object can be also achieved a communication control apparatus in a cellular mobile communication system which controls communication between each base station and a mobile station in which each base station can radiate radio wave beams to a plurality of directions and each base station communicates with mobile stations by using the same frequency by radiating a radio wave beam to the mobile station, the apparatus including:

a timing control part for controlling first timing at which a base station radiates a first radio wave beam such that the first timing is different from second timing at which another base station radiates a second radio wave beam which may cause interference with the first radio wave beam.

The above object can be also achieved a mobile station in a cellular mobile communication system in which each base station radiates a radio wave beam to a mobile station and each base station communicates with a mobile station by using the same frequency, the mobile station including:

a part for, when a received level in a mobile station for a signal by a radio wave beam coming from a base station directly is lowered, directing a radio wave beam to a direction from which another radio wave beam comes, and requesting allocation of a time slot for the another radio wave beam, the another radio wave beam having the best receiving quality among other radio wave beams arriving at the mobile station from the base station;

wherein the base station allocates the time slot such that the time slot is different from timing at which other base stations radiate radio wave beams which may cause interference with the another radio wave beam.

The mobile station also can be configured such that the mobile station includes:

a part for receiving a signal by a first radio wave beam from a direction of a base station, and directing a radio wave beam to a direction from which a second radio wave beam comes, the second radio wave beam being radiated by the base station and arriving at the mobile station;

a part for requesting allocation of a time slot for the second radio wave beam;

a part for combining a received signal by the first radio wave beam and a received signal by the second radio wave beam after the base station allocates the time slot such that the time slot is different from timing at which other base stations radiate radio wave beams which may cause interference with the second radio wave beam.

BRIEF DESCRIPTION OF THE DRAWINGS

Other objects, features and advantages of the present invention will become more apparent from the following detailed description when read in conjunction with the accompanying drawings, in which:

FIG. 7 shows an example of an interference management table;

FIG. 12 shows another example of an interference management table;

FIG. 13 is a block diagram showing a configuration example of a mobile station;

FIG. 14 is a figure for explaining an operation when a communication path is blocked by a building and the like;

DETAILED DESCRIPTION OF THE PREFERRED EMBODIMENTS

In the following, embodiments of the present invention will be described with reference to figures.

Figure 1:
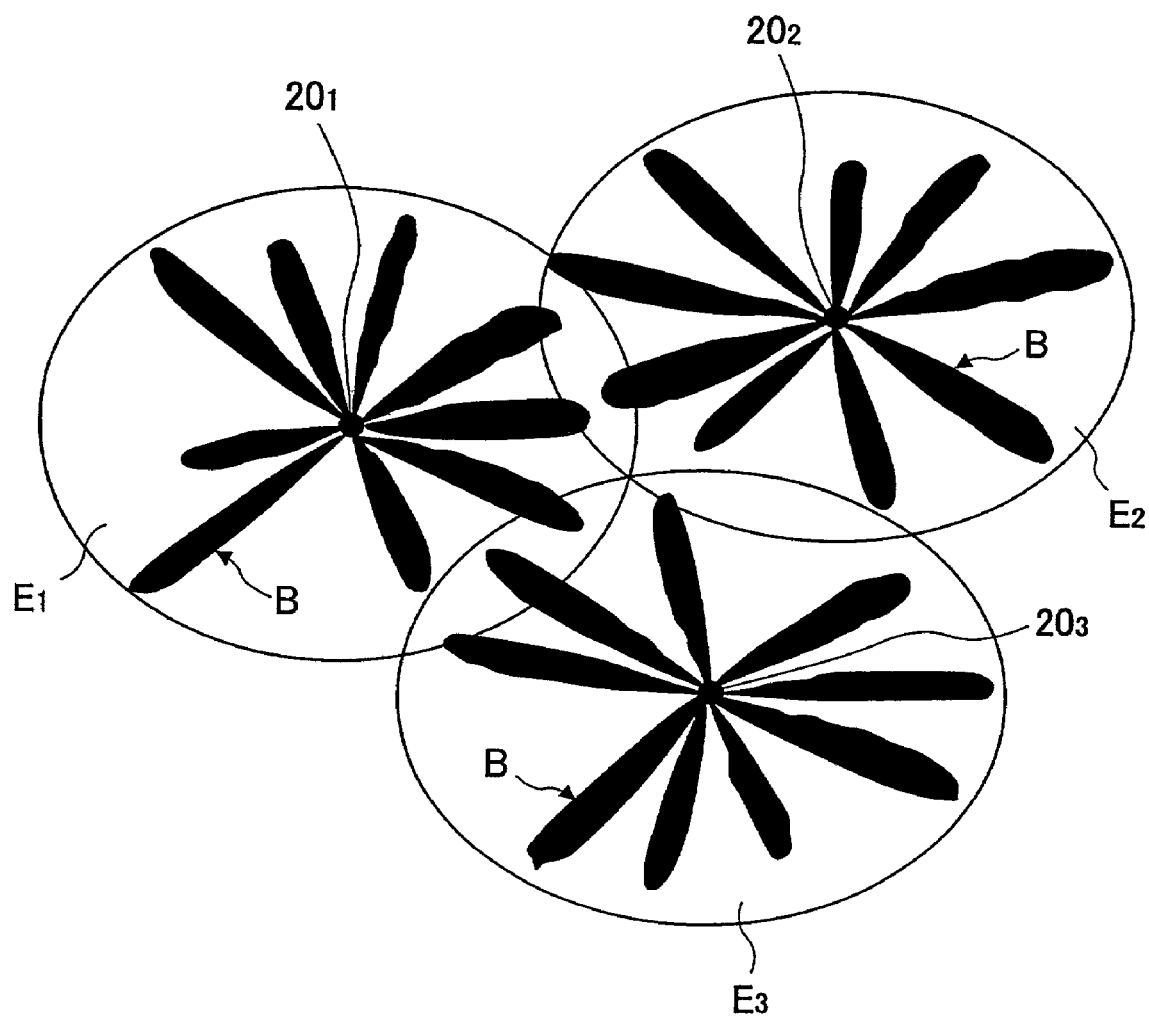
FIG. 1 shows an example of a conventional mobile communication system which performed communication control based on space division multiple access (SDMA)
Figure 2:
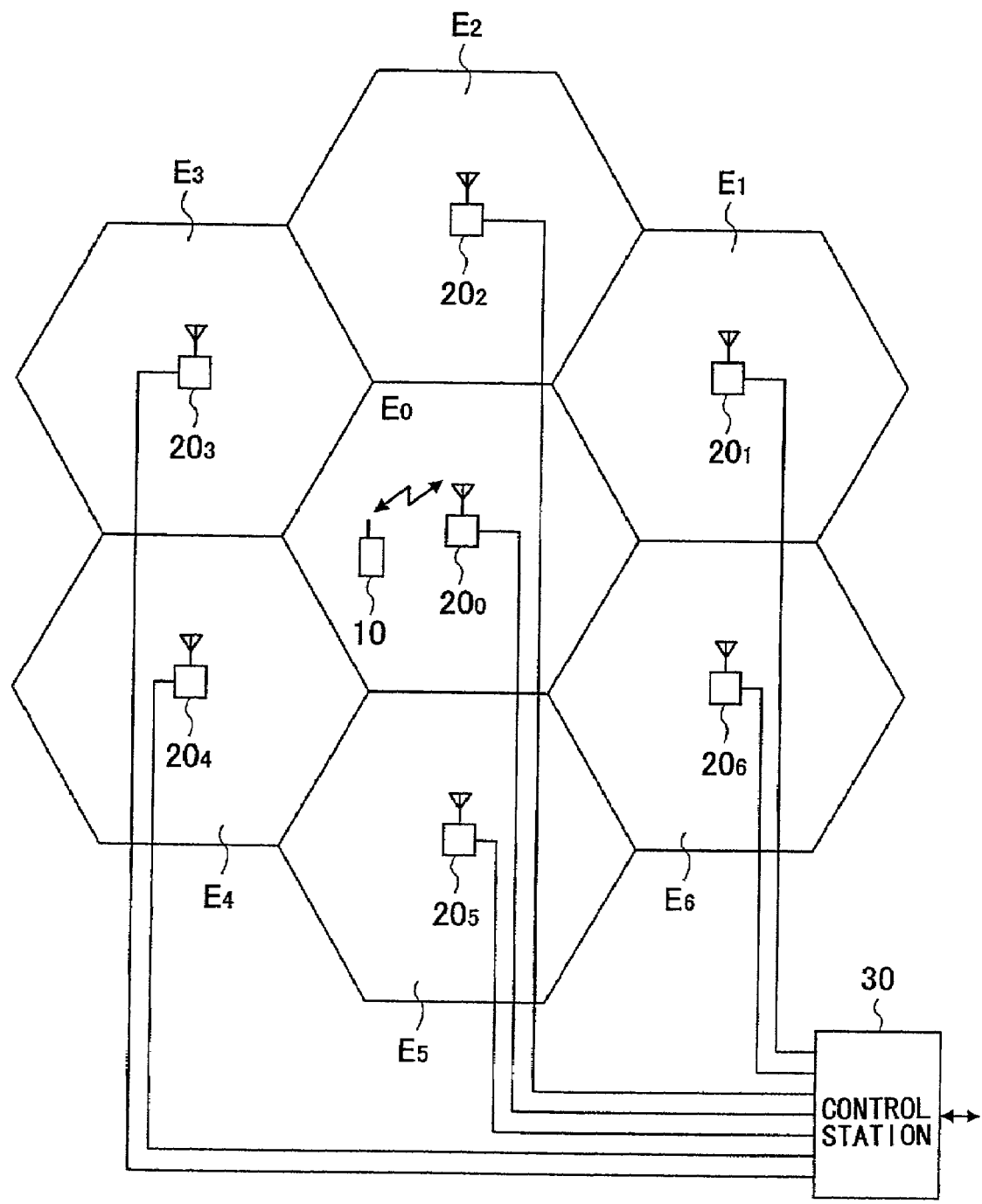
FIG. 2 shows a configuration example of a mobile communication system in which communication control between base stations and mobile stations is performed according to a communication control method of an embodiment of the present invention.

A mobile communication system in which communication control between base stations and mobile stations is performed according to a communication control method of an embodiment of the present invention is configured as shown in FIG. 2 for example.

As shown in FIG. 2, base stations $20_0$, $20_1$, $20_2$, $20_3$, $20_4$, $20_5$, $20_6$ which control communication areas (cells) E0, E1, E2, E3, E4, E5, E6 respectively are connected to a control station 30. A mobile station 10 (a cellular phone, a PHS terminal and a personal digital assistant (PDA) and the like) performs wireless communication with the base station $20_0$, and performs communication (voice communication, data communication) with another communication terminal via the base station $20_0$, the control station and a communication network (which is not shown in the figure). In the same way, mobile stations residing in other communication areas E1~E6 perform wireless communication with the base stations $20_1$, $20_2$, $20_3$, $20_4$, $20_5$, $20_6$ each controlling respective communication area. The base stations $20_1$, $20_2$, $20_3$, $20_4$, $20_5$, $20_6$ use the same frequency for wireless communication.

Each of the base stations $20_1$, $20_2$, $20_3$, $20_4$, $20_5$, $20_6$ (reference numeral 20 will be used for generically calling the base stations hereinafter) performs wireless communication with the mobile station basically according to SDMA. The configuration of the base station 20 is shown in FIG. 3 for example.

Figure 3:
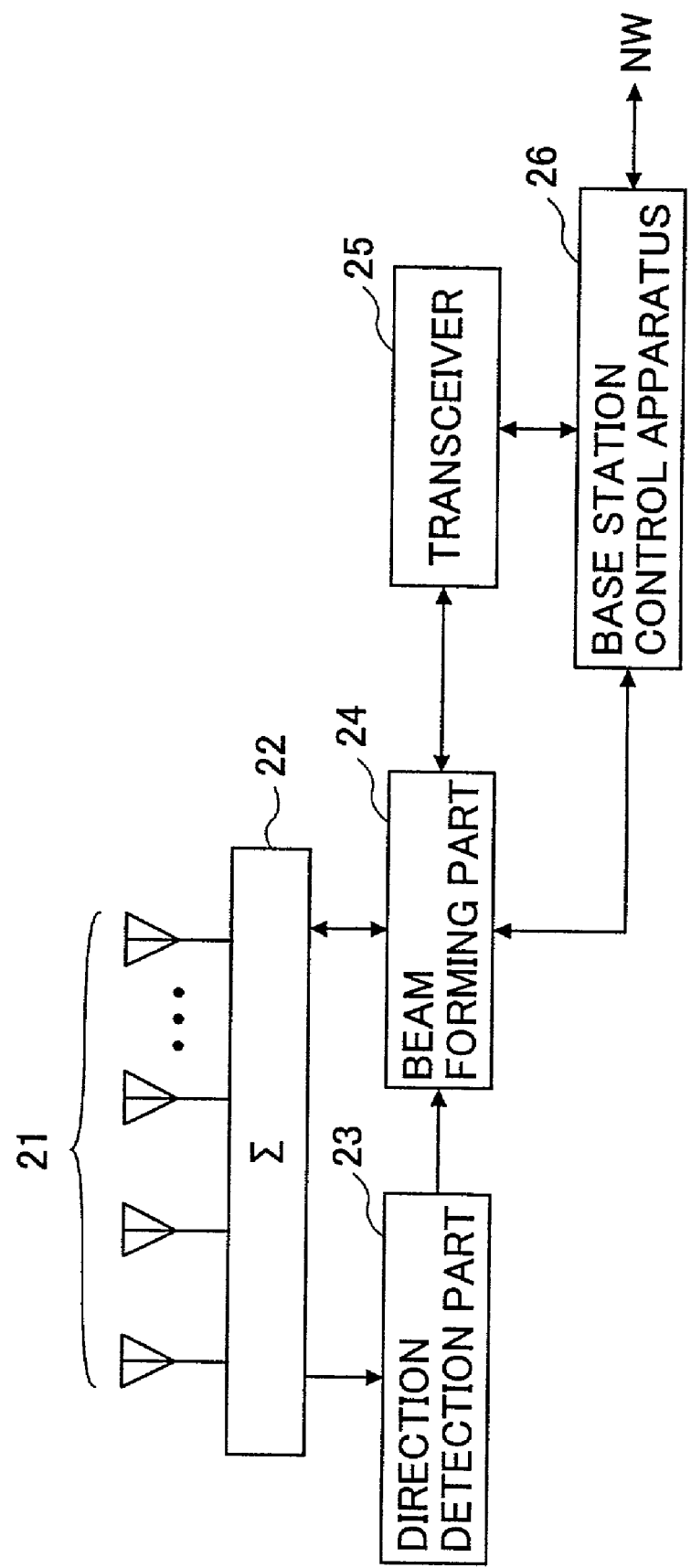
FIG. 3 is a block diagram showing a configuration example of each base station.

In FIG. 3, the base station 20 includes an array antenna 21 formed by a plurality of antenna elements, a combining part 22, a direction detection part 23, a beam forming part 24, a transceiver 25 and a base station control apparatus 26. The direction detection part 23 detects direction of a mobile station 10 communicating with the base station 20 according to received signals of each antenna element in the array antenna 21 input via the combining part 21. The beam forming part 24 sets a predetermined parameter such that a radio wave beam is formed in the direction of the mobile station 10 detected by the direction detection part 23 at radiation timing which is indicated from the base station control apparatus 26.

The transceiver 25 transmits/receives a signal with the mobile station 10 by using the radio wave beam formed in the above mentioned way via the array antenna 21, the combining part 22 and the beam forming part 24. When transmitting/receiving the signal, it is possible to apply any division multiple access method (TDMA, CDMA and the like). As mentioned above, the base station control apparatus 26 indicates the radiation timing of the radio wave beam to the beam forming part 26 and controls the transceiver 25 so as to transfer the signal received by the transceiver 25 to a communication network, and provides a signal from the communication network to the transceiver 25.

Figure 4:
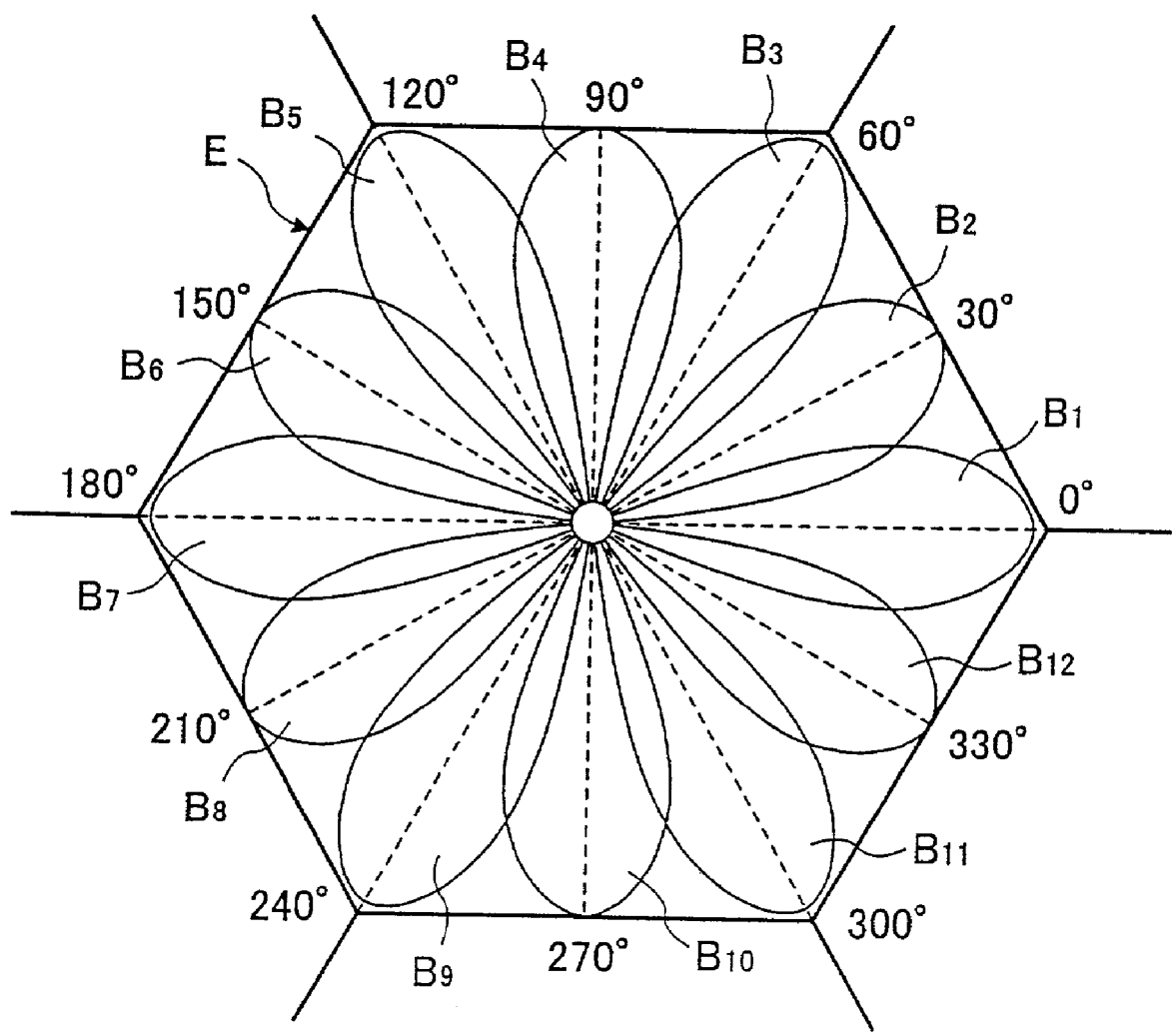
FIG. 4 shows an example of radio wave beams which can be radiated from each base station.

The base station 20 having the above-mentioned configuration forms a radio wave beam to the direction of the mobile station 10 by using a control method of so-called adaptive array antenna, and performs communication with the mobile station 10 by using channels (time slots, codes and the like) according to a predetermined division multiple access method (TDMA, CDMA and the like). Then, for example, as shown in FIG. 4, beams B1~Bm (B1~B12 in this case) directed to directions (0°, 30°, 60°, 90°, 120°, 150°, 180°, 210°, 240°, 270°, 300°, 330°, 360°) in which all directions of the communication area E are divided into m directions (12 directions in this case) can be formed. A part for the beams overlap with adjacent radio wave beams.

As shown in FIG. 2, the control station 30 manages directions and radiation timing (time) of radio wave beams formed by the base stations $20_0$, $20_1$, $20_2$, $20_3$, $20_4$, $20_5$, $20_6$. Details of methods of the management will be described later.

Figure 5:
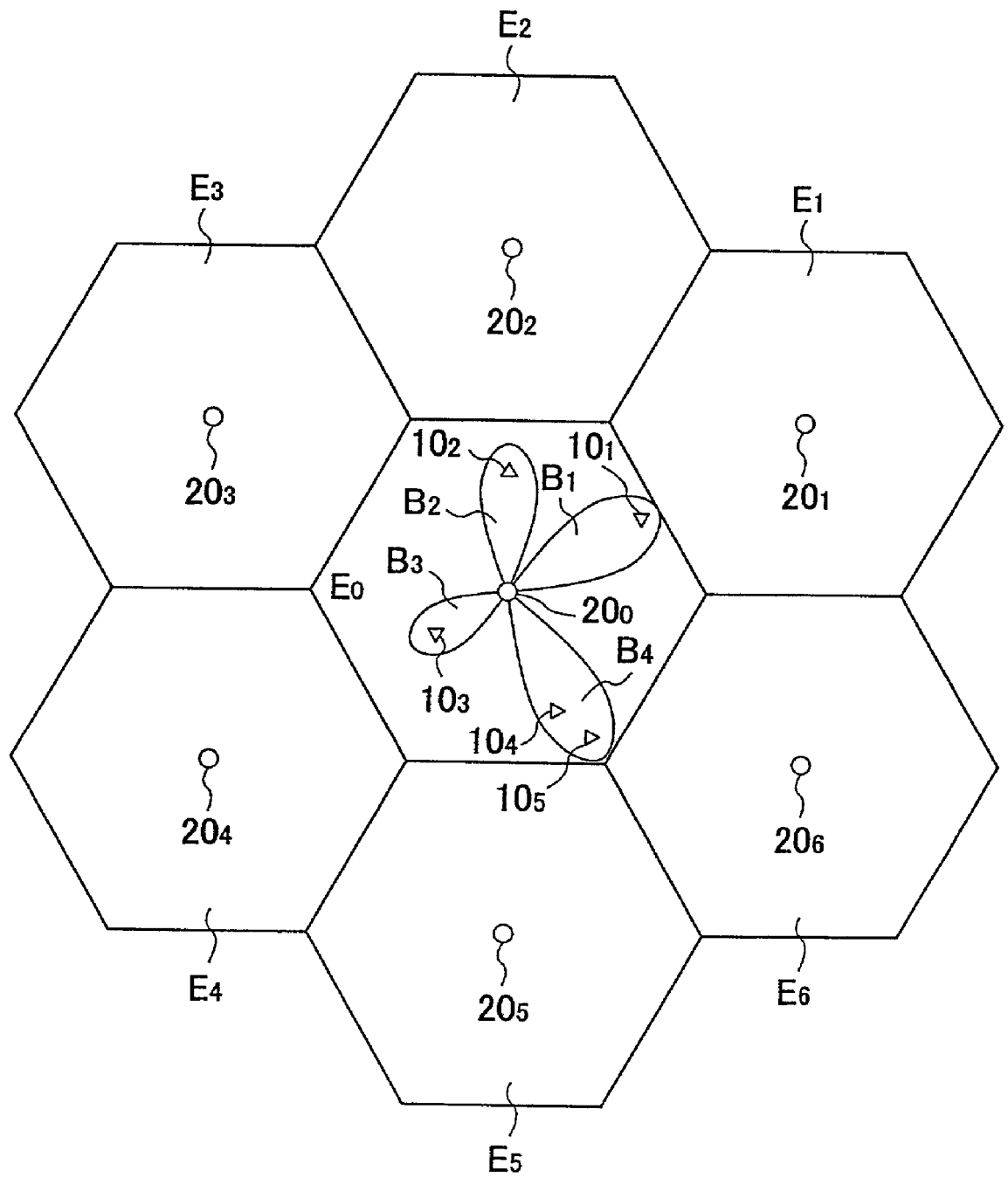
FIG. 5 shows states of each radio wave beam formed when a base station and mobile stations in the communication area performs communication.

For example, as shown in FIG. 5, in the communication area E0, when a mobile station $10_1$ resides in the direction of 30° a mobile station $10_2$ resides in the direction of 90°, and mobile stations $10_4$ and $10_5$ reside in the direction of 300°, the base station $20_0$ radiates radio wave beams B1, B2, B3, B4 to the directions of 30°, 90°, 240°, 300° respectively. Then, the base station $20_0$ (base station control station 26) controls each radio wave beam B1, B2, B3, B4 and each radiation timing (timing at which each radio wave beam is formed). The control of the radiation timing for the radio wave beams B1, B2, B3, B4 is performed such that the radio wave beams B1, B2, B3, B4 are radiated at different timings from radiation timings at which radio wave beams which may cause interference with the radio wave beams B1, B2, B3, B4 in the radio wave beams formed by the base stations $20_1\sim20_6$ which controls the communication areas E1~E6 which are adjacent to the communication area E0 of the base station $20_0$. In this example, it is assumed that the radio wave beams from the base station $20_0$ does not cause interference with radio wave beams from other base stations other than the adjacent base stations $20_1\sim20_6$ because of propagation loss.

Figure 6:
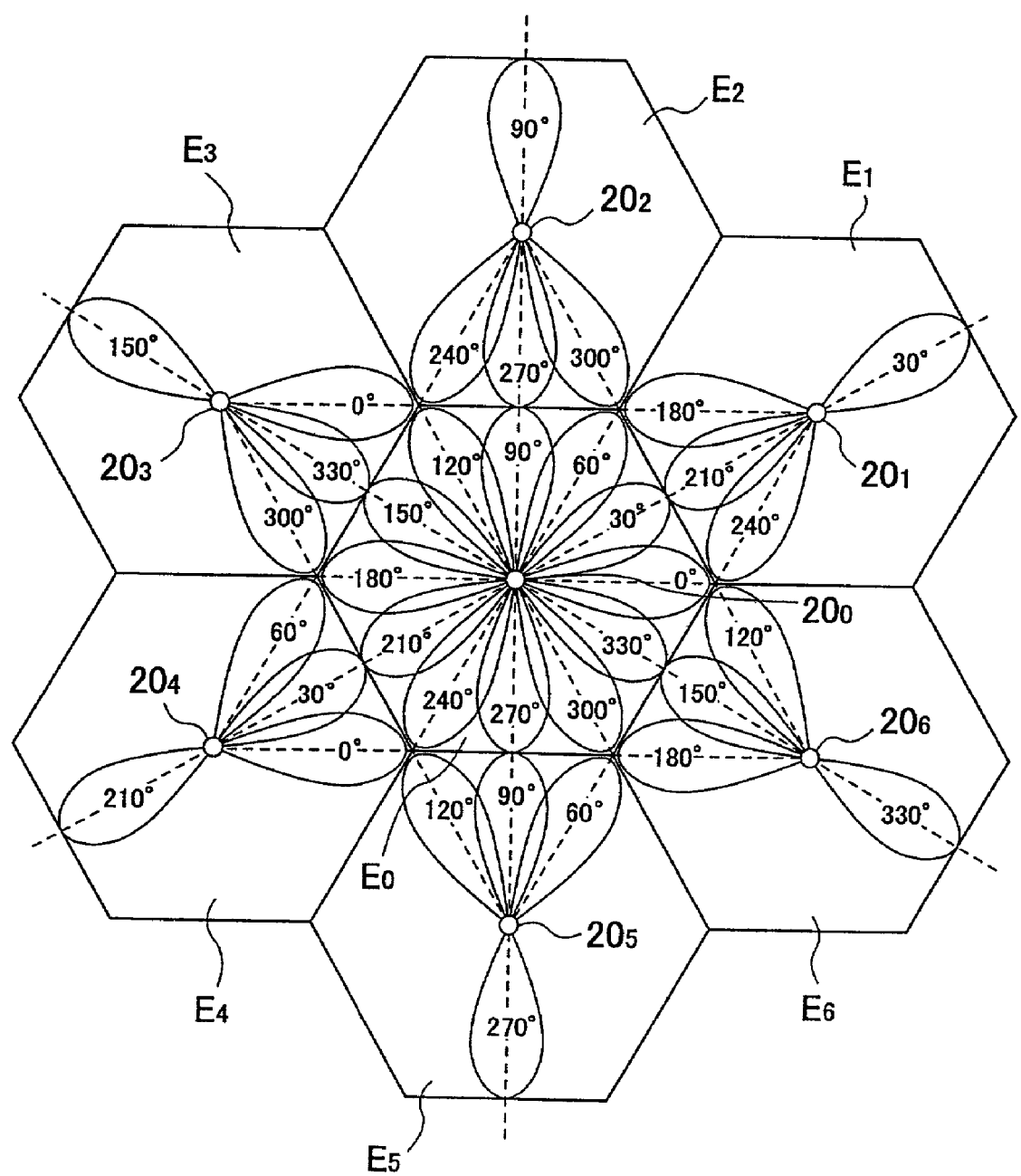
FIG. 6 shows an example of relationship between radio wave beams radiated from the base station $20_0$ and radio wave beams from the adjacent base stations $20_1\sim20_6$ which may cause interference.

The radio wave beams from the adjacent base stations $20_1\sim20_6$ which may cause interference with radio wave beams radiated from the base station $20_0$ can be predicted as shown in FIG. 6 for example.

In FIG. 6, it can be predicted that the radio wave beam radiated to the direction of 0° from the base station $20_0$ becomes interference wave for communication using the radio wave beam to the direction of 240° from the adjacent base station $20_1$ and for communication using the radio wave beam to the direction of 120° from the adjacent base station $20_6$. In addition, it can be predicted that the radio wave beam radiated to the direction of 30° from the base station $20_0$ becomes interference wave for communication using the radio wave beam to the direction of 210° (opposite direction) from the adjacent base station $20_1$ and for communication using the radio wave beam to the direction of 30° (same direction) from the adjacent base station $20_1$. In addition, it can be predicted that the radio wave beam radiated to the direction of 60° from the base station $20_0$ becomes interference wave for communication using the radio wave beam to the direction of 180° from the adjacent base station $20_1$ and for communication using the radio wave beam to the direction of 300° from the adjacent base station $20_2$. In addition, it can be predicted that the radio wave beam radiated to the direction of 90° from the base station $20_0$ becomes interference wave for communication using the radio wave beam to the direction of 270° from the adjacent base station $20_2$ and for communication using the radio wave beam to the direction of 90° from the adjacent base station $20_2$.

In the same way, it can be predicted that the radio wave beams radiated to the directions of 120°, 150°, 180°, 210°, 240°, 270°, 300° and 330° from the base station $20_0$ becomes interference wave for communication using the radio wave beams radiated to the directions shown in FIG. 6 from the adjacent base stations $20_2$, $20_3$, $20_4$ and $20_5$.

On the basis of prediction of interference caused by radio wave beams radiated from each base station for communication using radio wave beams radiated from adjacent base stations, the control station 30 manages the directions of the radio wave beams radiated form each base station and the radiation timings in the following way.

Each base station (base station control apparatus 26) controls radiation timing of radio wave beam of each direction for each time frame formed by a plurality of time slots which is defined beforehand in the system. According to such a control, the radio wave beam of each direction is radiated at a timing of the time slot which is allocated for the radio wave beam. Each base station reports time slots assigned to radio wave beams of each direction to the control station 30 successively. The control station 30 which receives the reports manages time slots allocated to radio wave beams radiated to each direction from each base station.

Then, on the basis of the reports, the control station 30 checks time slots already assigned to radio wave beams radiated from adjacent base stations which may cause interference with radio wave beams radiated from a base-station (base station $20_0$ for example) (refer to FIG. 6). As a result, the control station 30 generates an interference management table for each base station as shown in FIG. 7.

FIG. 7 shows the interference management table for the base station $20_0$.

In the interference management table, S5 is a time slot already assigned to the radio wave beam radiated to the direction of 240° from the adjacent base station $20_1$ corresponding to the direction of 0° from the base station $20_0$. In addition, S1 is a time slot already assigned to the radio wave beam radiated to the direction of 120° from the adjacent base station $20_6$ corresponding to the same direction of 0° from the base station $20_0$. In addition, in the interference management table, S2 and S6 are time slots already assigned to the radio wave beam radiated to the direction of 210° from the adjacent base station $20_1$ corresponding to the direction of 30° from the base station $20_0$. In addition, S3 is a time slot already assigned to the radio wave beam radiated to the direction of 30° from the same adjacent base station $20_1$. Further, in the interference management table, S4 and S5 are time slots already-assigned to the radio wave beam radiated to the direction of 180° from the adjacent base station $20_1$ corresponding to the direction of 60° from the base station $20_0$. In addition, S2 is a time slot already assigned to the radio wave beam radiated to the direction of 300° from the adjacent base station $20_2$ corresponding to the same direction from the base station $20_0$.

In addition, in the same way, this interference management table shows time slots already assigned to radio wave beams radiated from each adjacent base station corresponding to each direction (90°, 120°, 150°, 180°, 210°, 240°, 270°, 300°, 330°) from the bases station $20_0$.

The interference management table shows that there is no mobile station in the direction of 60° from the adjacent base station $20_5$ and the direction of 180° from the adjacent base station $20_6$ which are corresponds to the direction 300° from the base station $20_0$ and no radio wave beam is radiated.

The information in the interference management table is updated each time when time slots allocated for radiating the radio wave beams are reported to the control station 30 from each base station. The control station 30 transfers the interference management table to each base station each time when the information in the interference management table is updated.

The base station which received the interference management table refers to the interference management table and controls the radiation timings of radio wave beams to be formed to each direction. That is, time slots are allocated to radio wave beams of directions (0°, 30°, 60°, 90°, 120°, 150°, 180°, 210°, 240°, 270°, 300°, 330°) according to a predetermined rule such that time slots other than time slots already assigned to radio wave beams radiated from adjacent base stations to directions which may cause interference with the radio wave beams of the subject base station are allocated. In addition, when any radio wave beam is not radiated from the adjacent base stations to directions corresponding to directions from the subject base station, even when radio wave beams are radiated from the adjacent base stations to directions which are not corresponding to the direction, time slots are allocated to radio wave beams to be radiated to each direction from each base station irrespective of radiation beams from the adjacent base stations according to a predetermined rule.

Figure 8:
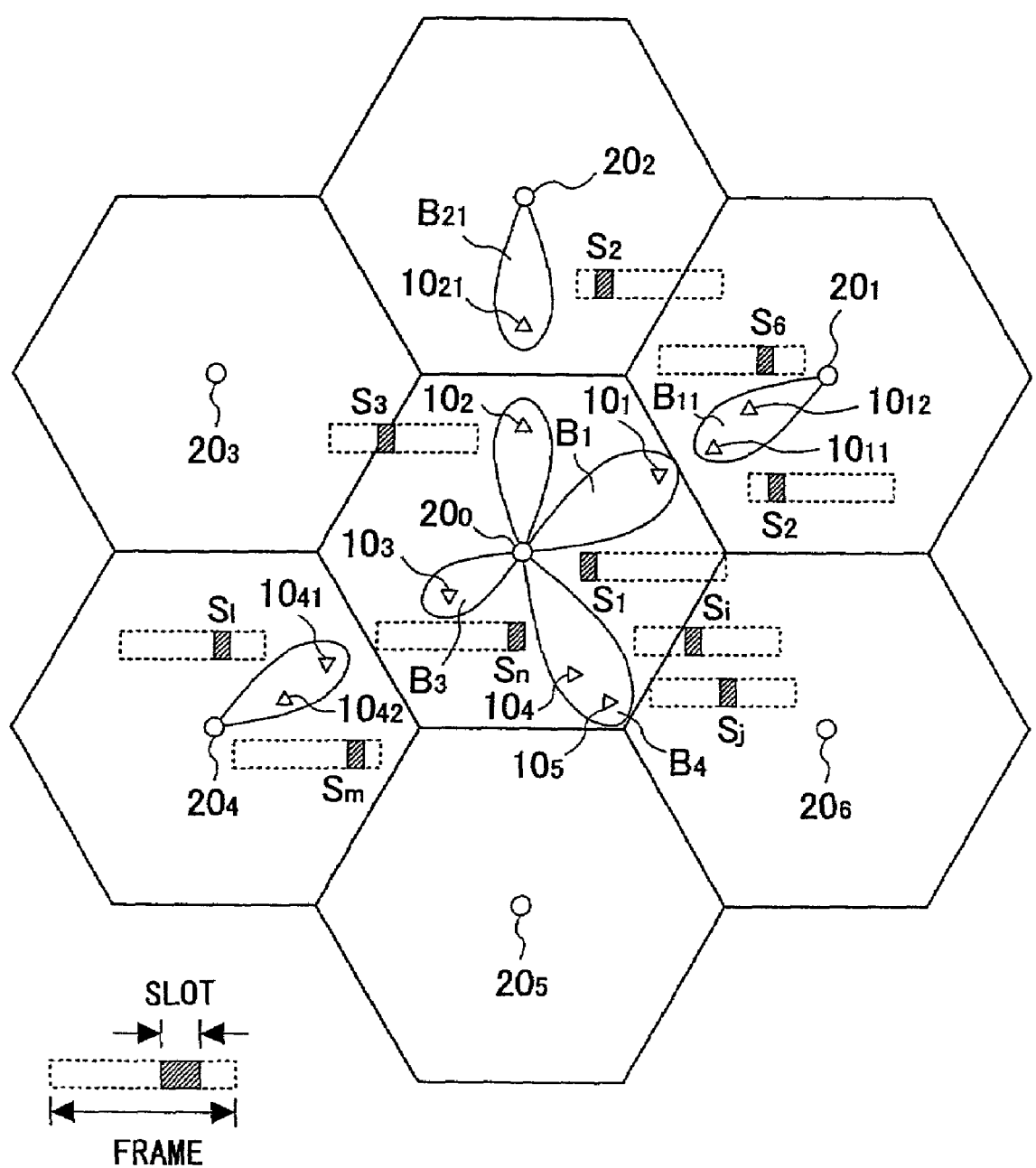
FIG. 8 shows an example of time slots allocated to radio wave beams radiated from each base station.

As a result of allocating time slots for radio wave beams radiated by each base station, for example, by the base station $20_0$, radiation timing control of the radio wave beam is controlled as shown in FIG. 8 for example.

In FIG. 8, the base station $20_0$ radiates a radio wave beam B1 to the direction of 30° to communicate with the mobile station $10_1$ at a timing of the time slot S1 which is different from time slots S2 and S6 of a radio wave beam B11 which is radiated by the adjacent base station $20_1$ to the direction of 210° corresponding to the direction of 30° of the beam B1 to communicate with the mobile stations $10_{11}$ and $10_{12}$. In addition, the base station $20_0$ radiates a radio wave beam B2 to the direction of 90° to communicate with the mobile station $10_2$ at a timing of the time slot S3 which is different from time slots S2 of a radio wave beam B21 which is radiated by the adjacent base station $20_3$ to the direction of 270° corresponding to the direction of 90° of the beam B2 to communicate with the mobile station $10_{21}$. In addition, the base station $20_0$ radiates a radio wave beam B3 to the direction of 210° to communicate with the mobile station $10_3$ at a timing of the time slot Sn which is different from time slots Sl and Sm of a radio wave beam B41 which is radiated by the adjacent base station $20_4$ to the direction of 30° corresponding to the direction of 210° of the beam B3 to communicate with the mobile stations $10_{41}$ and $10_{42}$.

Since no radio wave beam is radiated to the direction of 60° from the adjacent base station $20_5$ and to the direction of 180° from the adjacent base station $20_6$ which correspond to the direction of 300° from the base station $20_0$, the base station $20_0$ radiates a radio wave beam B4 to the direction of 300° to communicate with the mobile stations $10_4$ and $10_5$ at timings of time slots Si and Sj which are defined irrespective of radio wave beams radiated from the adjacent base stations $20_5$ and $20_6$.

As mentioned above, a time frame defined in the system for controlling radiation timing of radio wave beam is formed by time slots for control for a control signal such as a signal for notifying a mobile station of time slots (a time slot specifying signal) and time slots for communication for communication signal including information to be sent. Each base station switches types of the time slots (time slot for control or communication signal time slot) to be assigned to the radio wave beam according to purpose of communication (send/receive of control signal or send/receive of communication signal) with a mobile station of a communication partner.

The mobile station includes an array antenna and directs the beam to the direction from which radio wave is received most strongly. Then, when the base station radiates the radio wave beam at the timing of the time slot for control, the mobile station 10 receives a designating signal of time slot for communication. The mobile station receives a communication signal from the base station 20 when the base station radiates the radio wave beam at the timing of the time slot for communication designated by the designating signal. In addition, the mobile station 10 sends a communication signal to the base station 20 at the timing of the time slot for communication which is designated. The base station 20 receives the communication signal from the mobile station 10 at the timing of the time slot for communication. Accordingly, communication between the base station 20 and the mobile station is performed.

According to the control of radiation timing of the radio wave beam, base stations radiates radio wave beams to a direction where interference may occur in different time slots in a time frame. Thus, when base stations radiates radio wave beams to directions of mobile stations by using the same frequency, interference due to other radio wave beam for each mobile station can be decreased.

In the above example, when a plurality of mobile stations are included in a radio wave beam such as mobile stations $10_4$, $10_5$ in the radio wave beam B4 radiated in the direction of 300° from the base station $20_0$ (FIG. 8), although the base station changes time slot in each time frame for communicating with the mobile stations, it is possible that the radio wave beam is radiated in the same time slot and communication is performed by using different channels (time slots in TDMA, codes in CDMA).

In addition, when the number of mobile stations included in a radio wave beam exceeds a predetermined threshold, it is possible that the radio wave beam is radiated in a time slot and communication is performed by using different channels.

In addition, in the above example, although the time frame defined in the system is formed by the time slot for control and the time slot for communication, it is possible that different time frames can be used for the time slot for control and the time slot for communication when the control signal and the communication signal are received/transmitted by different channels (frequencies, codes). In this case, the radiation timing of the radio wave beam for the control signal and the radiation timing of the radio wave beam for the communication signal are controlled by each different time frame unit.

In addition, it is possible to control the number of time slots to be allocated to the radio wave beam for the mobile station according to communication state such as communication amount between the base station and the mobile station, and traffic (assigned state of time slots) in the base station.

Figure 9:
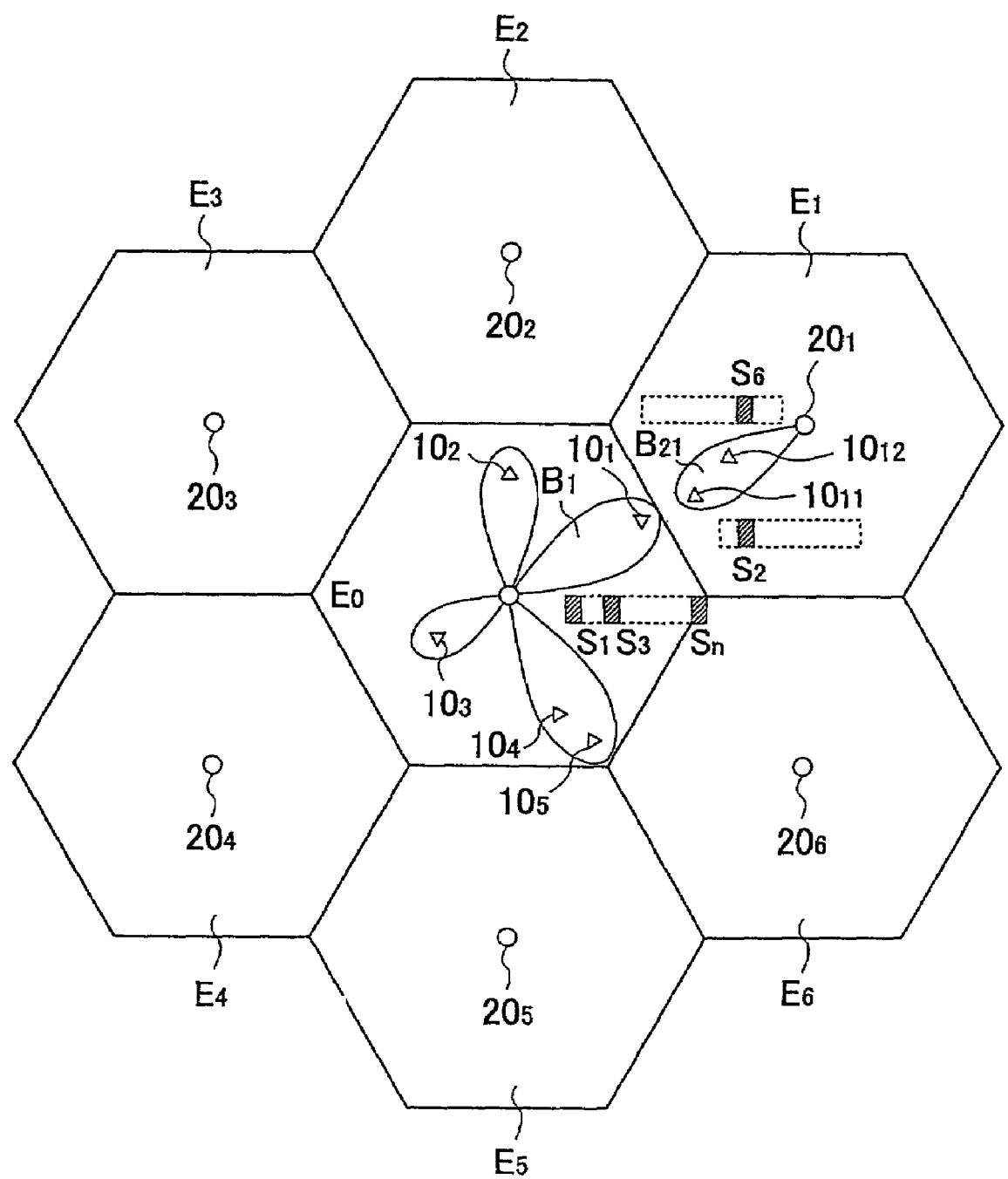
FIG. 9 shows another example of time slots allocated to radio wave beams radiated from each base station.

For example, in FIG. 9, when traffic in the base station $20_0$ decreases or when the communication amount between the base station $20_0$ and the mobile station $10_1$ increases, the base station $20_0$ radiates the radio wave beam B1 to the direction of 30° to communicate with the mobile station $10_1$ at timings of time slots S1, S3 and Sn which are different from the time slots S2 and S6 of the radio wave beam B11 which is radiated from the adjacent base station $20_1$ to the direction of 210° which corresponds to the direction of 30° to communicate with the mobile stations $10_{11}$ and $10_{12}$.

Figure 10:
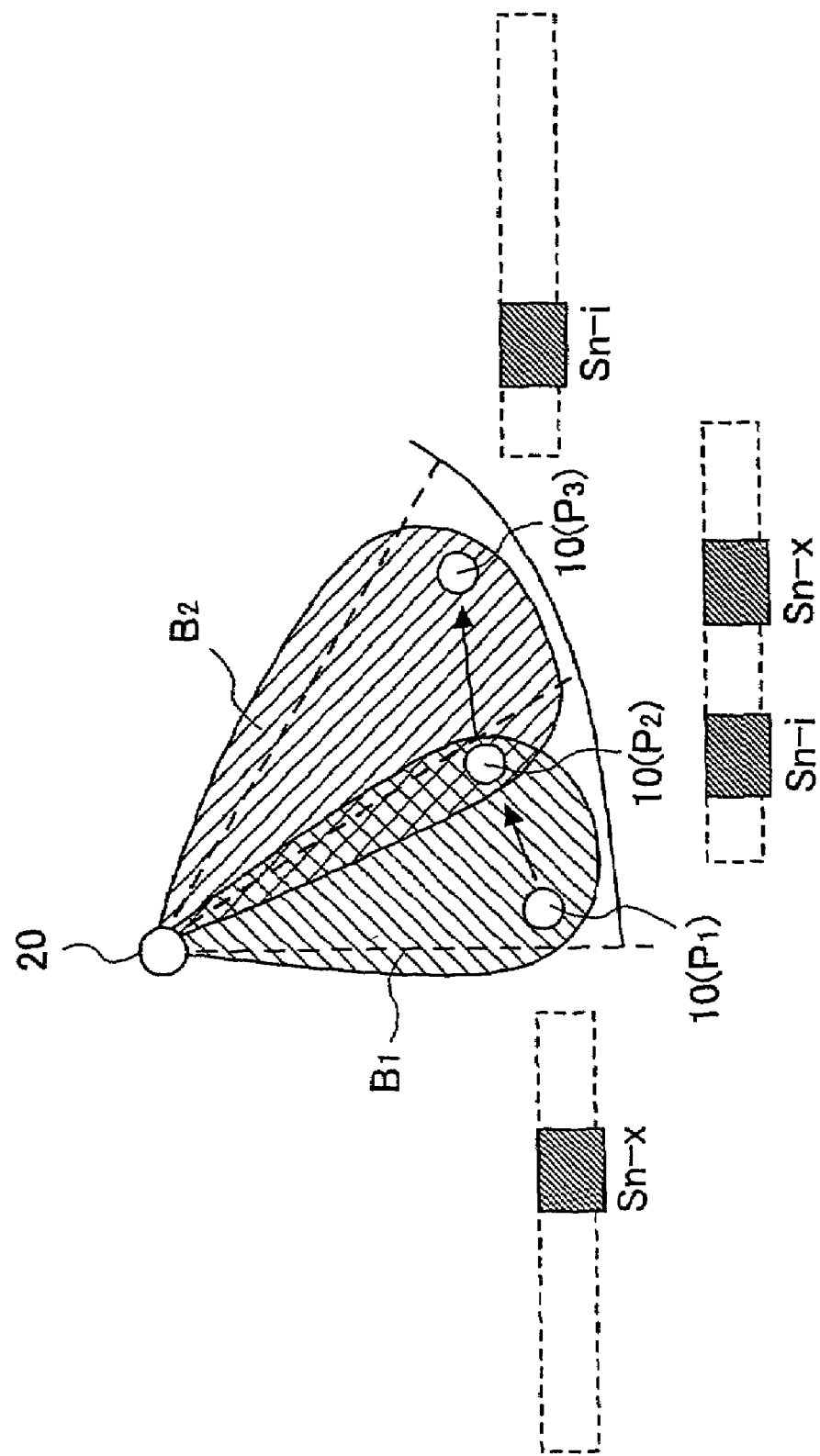
FIG. 10 shows an operation example when the mobile station performs handover.

When a mobile station moves from an area covered by a radio wave beam to another area covered by an adjacent radio wave beam, for example, as shown in FIG. 10, handover control is performed.

In FIG. 10, the base station 20 communicates with the mobile station 10 at a position P1 by radiating the radio wave beam B1 in a time slot Sn–x. When the mobile station 10 moves to a position P2 which is covered by both of the area covered by the radio wave beam B1 and the area covered by the radio wave beam B2 while communicating with the base station 20, the base station 20 continues communication with the mobile station by radiating the radio wave beam B1 in the time slot Sn–x and radiating the radio wave beam B2 in the time slot Sn–i. When the mobile station 10 moves to the position P3 which is covered by only the radio wave beam B2, the base station 20 continues communication with the mobile station 10 by radiating the radio wave beam B2 in the time slot Sn–i.

Figure 11:
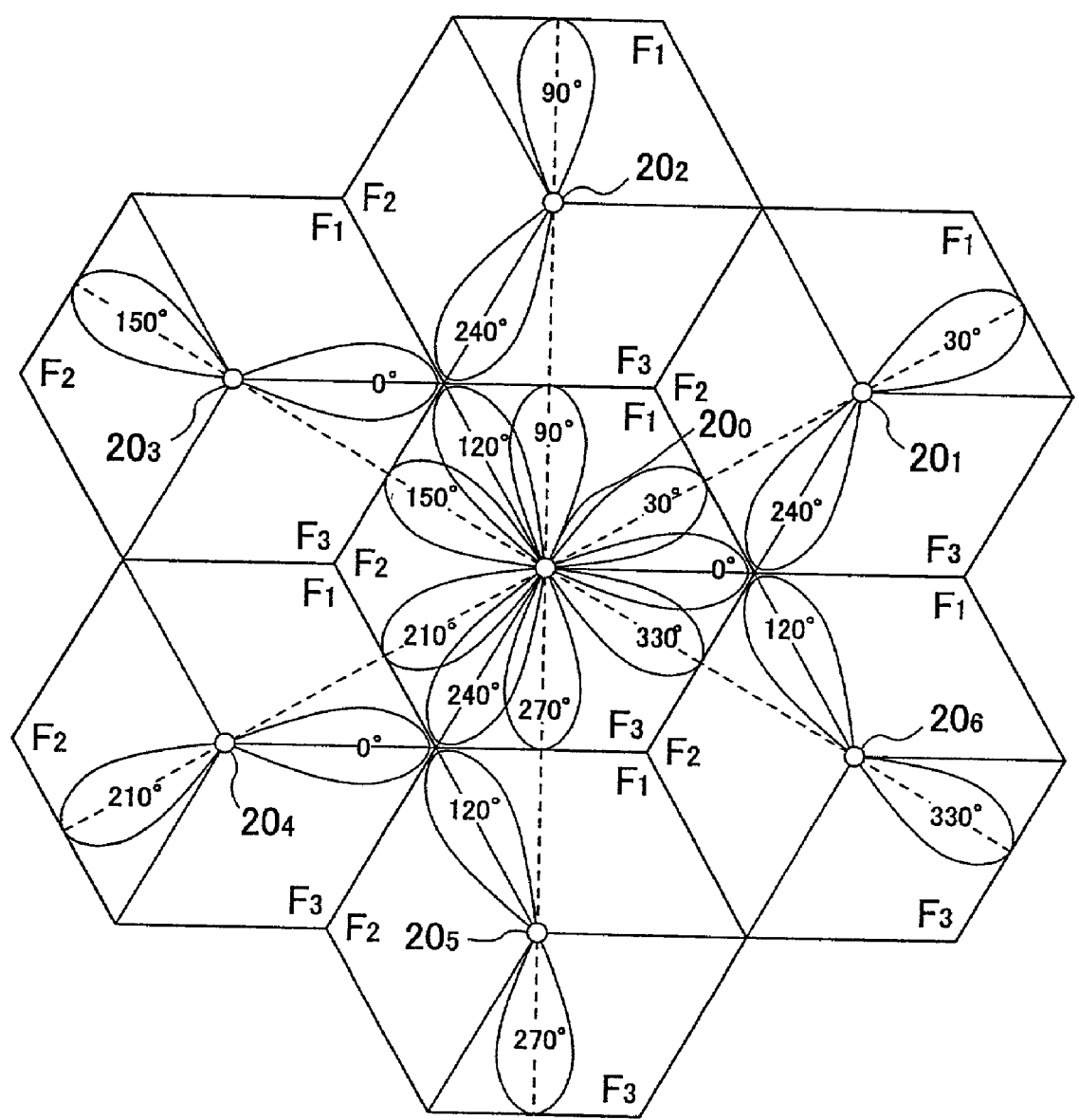
FIG. 11 shows another example of relationship between radio wave beams radiated from the base station $20_0$ and radio wave beams from the adjacent base stations $20_1\sim20_6$ which may cause interference.

The example shown in FIG. 6 represents interference state predicted when the same frequency is used for communication in every communication area (cell). For example, when each cell is divided into sectors to which frequencies F1, F2, F3 are allocated respectively as shown in FIG. 11, radio wave beams radiated from the base station $20_0$ to a sector to which a frequency F1 is allocated may become interference wave for sectors in adjacent base stations $20_6$, $20_1$, $20_2$, $20_3$ to which the frequency F1 is allocated. Concretely, it is predicted that the radio wave beam radiated to the direction of 0° from the base station $20_0$ acts as an interference wave for communication using a radio wave beam radiated from the adjacent base station $20_6$ to the direction of 120°. It is predicted that the radio wave beam radiated to the direction of 30° from the base station $20_0$ acts as an interference wave for communication using a radio wave beam radiated from the adjacent base station $20_1$ to the direction of 30°. In addition, it is predicted that the radio wave beam radiated to the direction of 90° from the base station $20_0$ acts as an interference wave for communication using a radio wave beam radiated from the adjacent base station $20_2$ to the direction of 90°. In addition, it is predicted that the radio wave beam radiated to the direction of 120° from the base station $20_0$ acts as an interference wave for communication using a radio wave beam radiated from the adjacent base station $20_3$ to the direction of 0°.

In the same way, radio wave beams radiated from the base station $20_0$ to a sector to which a frequency F2 is assigned may become interference wave for sectors in adjacent base stations $20_2$, $20_3$, $20_4$, $20_5$ to which the frequency F2 is assigned. In the same way, radio wave beams radiated from the base station $20_0$ to a sector to which a frequency F3 is assigned may become interference wave for sectors in adjacent base stations $20_4$, $20_5$, $20_6$, $20_1$ to which the frequency F3 is assigned.

According to prediction of state of interference due to radio wave beams radiated from each base station for communication using radio wave beams radiated from the adjacent base station, the control station 30 generates an interference management table as shown in FIGS. 12A, 12B and 12C for example according to time slots allocated to each radio wave beams reported from each base station.

FIGS. 12A, 12B and 12C show the interference management tables for the base station $20_0$.

The interference management table shown in FIG. 12A is for managing time slots assigned to each radio wave beam radiated to the sector to which the frequency F1 is assigned. In FIG. 12A, S4 is a time slot assigned for radiating a radio wave beam from the adjacent base station $20_6$ to the direction 120° which corresponds to the direction 0° from the base station $20_0$. S2 is a time slot assigned for radiating a radio wave beam from the adjacent base station $20_1$ to the direction 30° which corresponds to the direction 30° from the base station $20_0$. In addition, S4 and S6 are time slots assigned for radiating a radio wave beam from the adjacent base station $20_2$ to the direction 90° which corresponds to the direction 90° from the base station $20_0$. S1 is a time slot assigned for radiating a radio wave beam from the adjacent base station $20_3$ to the direction 0° which corresponds to the direction 120° from the base station $20_0$.

The interference management table shown in FIG. 12B is for managing time slots assigned to each radio wave beam radiated to the sector to which the frequency F2 is assigned. The interference management table shown in FIG. 12C is for managing time slots assigned to each radio wave beam radiated to the sector to which the frequency F3 is assigned. In the same way as FIG. 12A, FIGS. 12B and 12C indicate time slots which are already assigned for radiating from adjacent base station to a direction corresponding to a direction of radio wave beam radiated from the base station $20_0$.

In the same way as the before mentioned example, the base station $20_0$ which receives the interference management table refers to the interference management table, and determines radiation timings of radio wave beams of each direction which may cause interference such that each of the radiation timings is different from a radiation timing of a radio wave beam radiated to the corresponding direction from the adjacent base station.

Accordingly, by dividing the cell controlled by each base station into a plurality of cells, the number of radio wave beams from adjacent base stations which may be affected by radio wave beams radiated by the base station as interference decrease. Thus, control of radiation timing of radio wave beams by using the interference management table can be more simplified.

In each above-mentioned example, the control station 30 generates the interference management table and sends it to each base station. However, the present invention is not limited to this method. By transferring time slots assigned to radio wave beams radiated to each direction between base stations, the radiation timings of radio wave beams for each direction can be determined on the basis of the transferred information in consideration of the above-mentioned interference.

In each of the above-mentioned examples, the timing control part which forms communication control apparatus is realized by the functions of the control station 30 and the base station $20_0$.

<Second Embodiment>

Next, the second embodiment of the present invention will be described.

In the method such as SDMA which uses narrow beams, radio wave from the base station is often blocked by a building and the like around the mobile station, thus, it becomes difficult to keep a communication path between a base station and a mobile station. On the other hand, a beam radiated to other direction may be reflected from buildings and the like so that the beam reaches the mobile station (radiating radio waves to various directions by using broad beam is equivalent to radiating many narrow beams to various directions). Thus, the mobile station can keep a path by directing a beam to a direction of reflected wave instead of directing to the opposed base station.

However, according to SDMA which uses a beam of one direction continuously, when communication is performed by using the beam, any time slot can not be allocated to a communication of other direction. When assigning the time slot by using CDMA in addition to SDMA, system capacity is pressured since interference amount increases. In any way, the communication quality is deteriorated.

In the TSDMA method in which a beam is used by time-division multiplexing as explained in the first embodiment, another slot other than a slot being used in a beam can be allocated to another communication.

From this viewpoint, in this embodiment, when the mobile station directs a beam to an opposite base station and the base station forms null to a reflected wave direction, when received level is lowered because a path is blocked by buildings and the like, the mobile station directs a beam to a direction from which another beam which has maximum power, and requests slot allocation for the beam to the base station to keep a path. Accordingly, it becomes possible to perform path diversity so that the above-mentioned problem due to narrowing beams can be solved and communication path having few interference can be kept.

The mobile station can detect the another beam having maximum power, for example, by grasping received levels of each direction by performing polling. The base station which received the slot allocation request allocates time slots by referring to the interference management table shown in FIG. 7.

In addition, when the mobile station receives a designated time slot by directing beam to the opposite base station (directing beam to the direction of the base station), the mobile station can request slot allocation for other beam having the maximum power which comes from different direction and receives a designated slot, and performed selection combining of there slots.

The configuration of the mobile station having an adaptive array antenna (a directional antenna) for realizing the above-mentioned function is shown in FIG. 13.

This mobile station includes an array antenna 31 formed by a plurality of antenna elements, a combining part 32, a direction detection part 33, a beam forming part 34, and a transceiver 35. The direction detection part 33 detects direction of the beam having the maximum power according to received signals of each antenna element in the array antenna 31 input via the combining part 32. The beam forming part 34 sets a predetermined parameter such that a radio wave beam is formed in the direction of the base station or the direction of the beam having the maximum power detected by the direction detection part 33.

The transceiver 35 transmits/receives a signal with the base station by using the radio wave beam formed in the above mentioned way via the array antenna 31, the combining part 32 and the beam forming part 34. When transmitting/receiving the signal, it is possible to apply any division multiple access (TDMA, CDMA and the like).

The mobile station having the above-mentioned configuration forms a radio wave beam to the direction of the beam (reflected wave) having the maximum beam by using a control method of so-called adaptive array antenna, and performs communication with the base station by using channels (time slots, codes and the like) according to a predetermined division multiple access (TDMA, CDMA and the like).

Next, a concrete operation of the system will be described by using FIG. 14 in which when received level is lowered when the path between the base station and the mobile station is blocked by buildings and the like, the mobile station directs a beam to a direction from which other beam having the maximum power comes, and requests slot allocation for the other beam so that a path is kept.

Normally, the mobile station directs a beam to the base station of the communication partner, and forms null to a reflected direction of other beam. In the case that the base station $20_0$ radiates a beam A to the direction of 270° in the communication area E0, when there is an intercepting object SA such as an building and the like between the mobile station #j and the base station $20_0$, the radio wave of the beam A from the base station $20_0$ is attenuated so that the received level at the mobile station #j decreases.

At this time, when there is a radio wave propagation route reaching the mobile station #j in which the radio wave of the beam B radiated to the direction of 300° from the base station $20_0$ is reflected by a reflecting object SB, the mobile station #j measures power of radio wave beams radiated from the base station $20_0$ by using the adaptive array antenna or the directional antenna owned by the mobile station #j and selects a beam of which receiving quality such as received signal level is the best (the maximum). At this time, the antenna of the mobile station #j does not necessarily direct to the base station $20_0$ geometrically. The antenna is controlled such that it directs to a direction (direction to the reflecting object SB from the mobile station #j) in which the receiving quality (power of radio wave in this example) is the maximum. Then, the mobile station directs a beam to the direction, requests time slot allocation for the reflected beam so that a communication path is kept.

Time slot allocation at this time is described by using the interference management table of FIG. 7 in the following.

As shown in the interference management table of FIG. 7, a time slot Sk is allocated to the direction of 270° of the adjacent base station $20_5$ corresponding to 270° of the base station $20_0$ and a time slot Si is allocated to the direction of 90° of the adjacent base station $20_5$ corresponding to 270° of the base station $20_0$. In addition, no time slot is allocated to directions of 60° of the adjacent base station $20_5$ and 180° of the adjacent base station $20_6$ corresponds to the direction of 300° from the base station $20_0$ which is the direction of the beam B. Thus, a time slot Sm other than Sk and Si is assigned for communication of the mobile station by the reflected beam B.

The communication with the mobile station #j is managed by time slot of the direction of beam A and the direction of beam B. Information on the time slot allocation is sent to the control station and the interference management table of each base station is updated.

Next, concrete operation of the system will be described in which selection combining between time slot of the beam of the direction of the base station and the time slot of other beam having the maximum power will be described by using FIG. 15.

Figure 15:
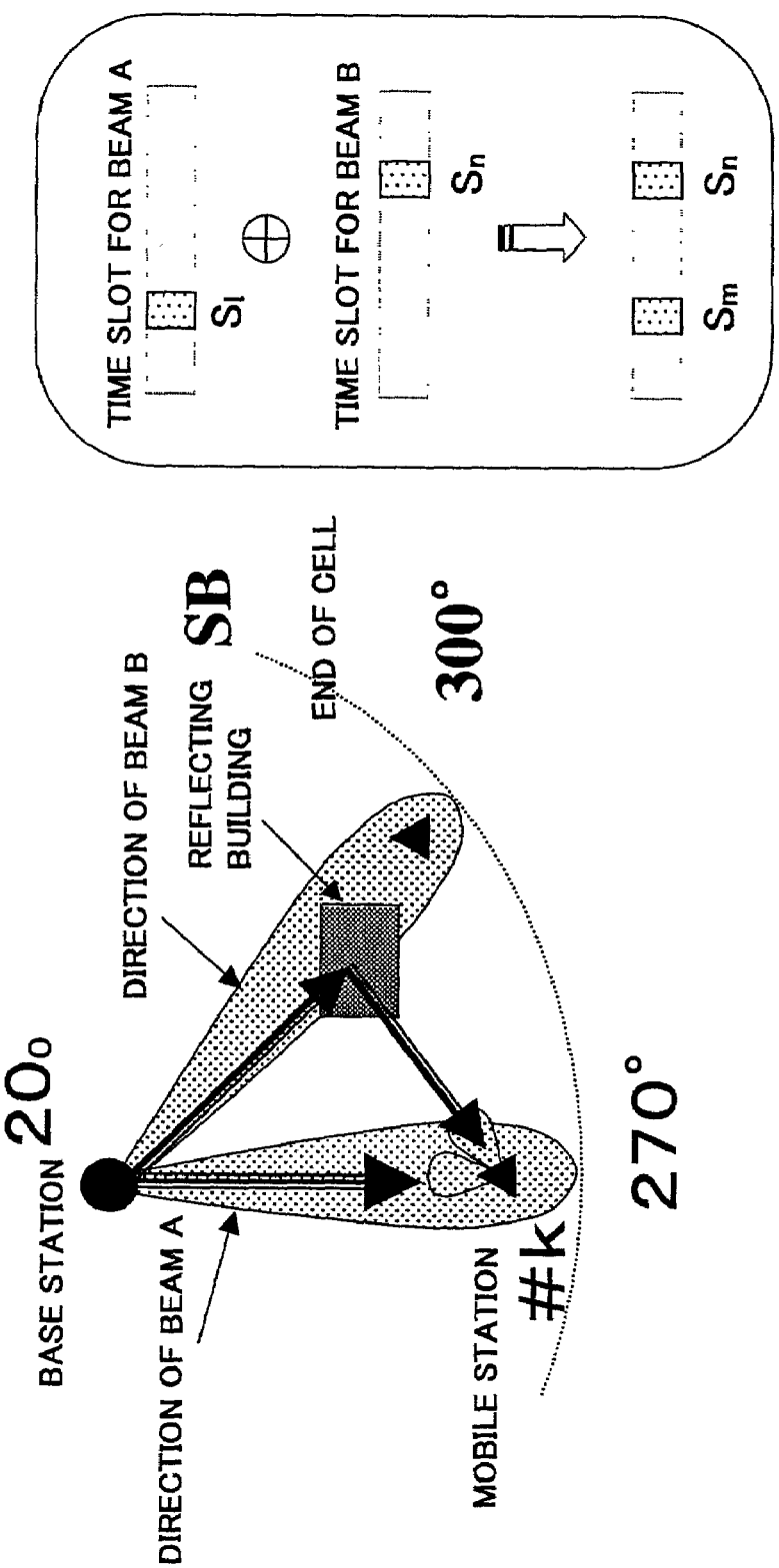
FIG. 15 is a figure for explaining an operation when the mobile station receives signal from two directions and combines the signals.

In FIG. 15, when the base station $20_0$ radiates the beam A to the direction of 270° in the communication area E0 of the base station $20_0$, a radio wave propagation route is formed between the mobile station #j and the base station $20_0$ so that communication is performed. At this time, there is a case where another beam B radiated by the base station $20_0$ is reflected by a building and the like SB so that a radio wave communication path is formed between the reflection building SB and the mobile station #j and communication is available. That is, communication is available by both of the route between the base station $20_0$ and the mobile station #j and the route between the building SB and the mobile station #j.

Generally, characteristics of radio wave propagation paths formed by the beam A and the beam B are different, that is, time variation characteristics of radio wave propagation are different (when the mobile station #j moves). In such a case, it is better to use both of the beam A and beam B than to select one of the beams. That is, when there is an available time slot for each beam, time slots are provided for each beam for radiating radio wave, and the mobile station #j forms antenna beams to a plurality of directions from which the radio waves comes. Then, the mobile station #j combines and receives the radio waves come from both directions. Accordingly, communication quality can be kept.

Also in this case, in the same way as the above-mentioned example, in the interference management table of FIG. 7, a time slot Sk is allocated to the direction of 270° of the adjacent base station $20_5$ corresponding to 270° of the base station $20_0$ and a time slot Si is allocated to the direction of 90° of the adjacent base station $20_5$, corresponding to 270° of the base station $20_0$. In addition, since no time slot is allocated to directions of 60° of the adjacent base station $20_5$ and 180° of the adjacent base station $20_6$ corresponds to the direction of 300° from the base station $20_0$ which is the direction of the beam B, a time slot Sm other than Sk and Si is allocated for beam A, and a time slot Sn other than Sk, Si and Sm is allocated to the beam B. The time slot Sm allocated to the beam A can be considered as a time slot already assigned. As for the method for combining, any of selection combining, maximum ratio combining and same gain combining can be used.

In the same operation of the mobile station, when the base station directs a beam to a direction of a mobile station, when a path is blocked by buildings and the like, the base station directs a beam to a direction from which another beam which has maximum power comes so that a path is kept. This operation can be performed by information on the request of slot assignment.

The above-mentioned beam switching and combining can be performed also when the mobile station has a non-directional antenna instead of the directional antenna such as the adaptive array antenna.

Figure 14:
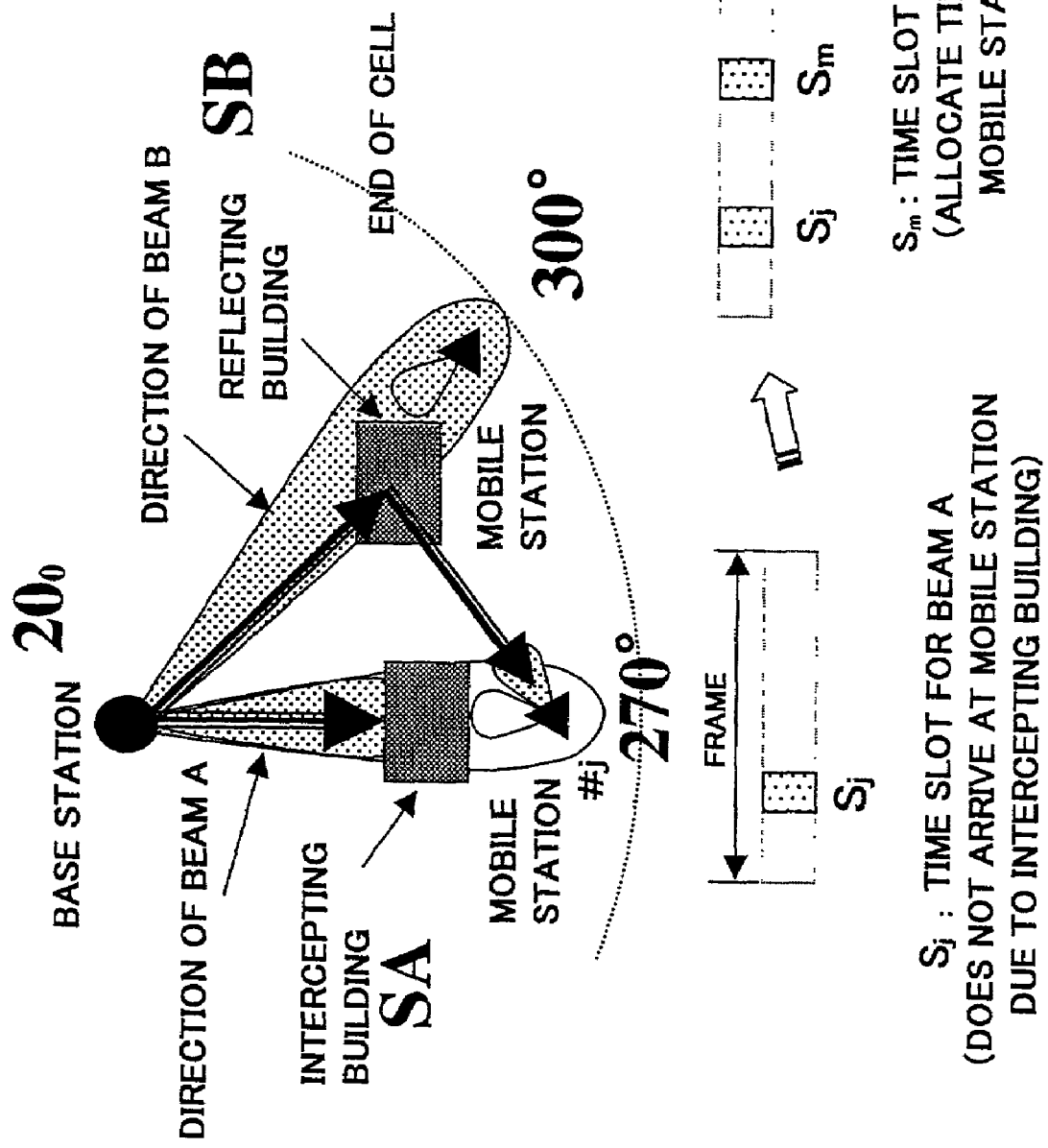

When beams from the base station $20_0$ is in a state shown in FIG. 14, the mobile station #j which includes the non-directional antenna measures powers of each radio wave beams radiated from the base station $20_0$ by using the antenna of the mobile station #j, and selects a beam of which receiving quality such as received signal level is the best (maximum) (in this case, selects the beam which is radiated to the direction of 300° and reflected by the intercepting object SB). Accordingly, communication by using the beam B can be performed in the same way as using the directional antenna. Assignment of time slot is performed in the same way as the case using the directional antenna.

Next, when the mobile station includes the non-directional antenna instead of the directional antenna, a case where the mobile station performs combining of time slots of beams from a plurality of directions as shown in FIG. 15 will be described.

When beams from the base station $20_0$ is in a state shown in FIG. 15, the mobile station combines received signals of the beams A and B instead of selecting one of the beams A and B in which time slots for radio wave radiation are provided if there is an available time slot for each beam. Assignment of time slots is the same as the case where the directional antenna is used.

At this time, the mobile station #j receives radio waves coming from a plurality of directions in which the radio waves arrive at the mobile station in different times. In such a case, path diversity effect can be used by using RAKE receiver in a receiver of CDMA in which signals from a plurality of paths which have time difference are combined. In other digital communication method which does not perform code spreading, it is possible to perform equalizing and combining received signals coming via a plurality of paths by using transversal filter in which a plurality of transmission signal symbol time intervals or an integral submultiple is set. As a result, receiving characteristics can be improved by using path diversity effect.

As mentioned above, according to the present invention, since it can be prevented that radio wave beams are simultaneously radiated to a point where interference may occur from a plurality of base stations, a communication control method and apparatus based on SDMA which can decreases interference due to radio wave beams radiated to the mobile station from each base station in a mobile communication system.

In addition, even when a communication path from the base station to the mobile station is blocked by a building and the like, a path can be kept by allocating a time slot to the other radio wave beam having the maximum power. Thus, reliability of communication can be improved.

In addition, when receiving radio waves of the base station from a plurality of directions, communication quality can be improved by combining received signals.

The present invention is not limited to the specifically disclosed embodiments, and variations and modifications may be made without departing from the scope of the invention.

What is claimed is:

1. A communication control method used in a cellular mobile communication system in which each base station can radiate radio wave beams to a plurality of directions and each base station communicates with mobile stations by using the same frequency by radiating radio wave beams to the mobile stations, said method comprising the steps of:

receiving at a control station from a base station, radiation timing information for radiating a radio wave beam in a direction;

controlling based on said received radiation timing information, first timing at which a base station radiates a first radio wave beam such that said first timing is different from second timing at which another base station radiates a second radio wave beam which may cause interference with said first radio wave beam; and sending updated radiation timing information from the control station to the base station.

2. A communication control method used in a cellular mobile communication system in which each base station can radiate radio wave beams to a plurality of directions and each base station communicates with mobile stations by using the same frequency by radiating radio wave beams to the mobile stations, said method comprising the steps of:

receiving at a control station from a base station, radiation timing information for radiating a radio wave beam in a direction;

controlling based on said received radiation timing information, first timing at which a base station radiates a first radio wave beam such that said first timing is different from second timing at which another base station radiates a second radio wave beam which may cause interference with said first radio wave beam;

sending updated radiation timing information from the control station to the base station;

predetermining other base stations for which interference caused by radio wave beams radiated by a base station should be considered;

notifying said base station of directions and radiation timing of radio wave beams radiated by said other base stations;

controlling said base station on the basis of said directions and radiation timing such that timing at which said base station radiates radio wave beams is different from timing at which said other base stations radiate radio wave beams which may cause interference with radio wave beams radiated by said base station.

3. The communication control method as claimed in claim 2, wherein said each of other base stations is an adjacent base station to said base station.

4. A communication control method used in a cellular mobile communication system in which each base station can radiate radio wave beams to a plurality of directions and each base station communicates with mobile stations by using the same frequency by radiating radio wave beams to the mobile stations, said method comprising the steps of:

receiving at a control station from a base station, radiation timing information for radiating a radio wave beam in a direction;

controlling based on said received radiation timing information, first timing at which a base station radiates a first radio wave beam such that said first timing is different from second timing at which another base station radiates a second radio wave beam which may cause interference with said first radio wave beam;

sending updated radiation timing information from the control station to the base station;

when a base station which communicates with a mobile station switches a radiating radio wave beam from a first radio wave beam to a second radio wave beam as said mobile station moves, controlling said base station such that timing at which said first radio wave beam is radiated is different from timing at which said second radio wave beam is radiated.

5. The communication control method as claimed in claim 1, said method comprising the step of:

when a radio wave beam which is radiated by a base station covers a plurality of mobile stations, controlling said base station such that timing at which said radio wave beam is radiated is different for each mobile station.

6. The communication control method as claimed in claim 1, said method comprising the step of:
controlling timing of a radio wave beam at which a base station radiates such that said radio wave beam is radiated for a mobile station in a plurality of time slots at predetermined intervals.

7. The communication control method as claimed in claim 6, wherein the number of said time slots is determined on the basis of communication state in said base station.

8. A communication control method used in a cellular mobile communication system in which each base station can radiate radio wave beams to a plurality of directions and each base station communicates with mobile stations by using the same frequency by radiating radio wave beams to the mobile stations, said method comprising the steps of:
receiving at a control station from a base station, radiation timing information for radiating a radio wave beam in a direction;
controlling based on said received radiation timing information, first timing at which a base station radiates a first radio wave beam such that said first timing is different from second timing at which another base station radiates a second radio wave beam which may cause interference with said first radio wave beam;
sending updated radiation timing information from the control station to the base station;
when a received level in a mobile station for a signal by a radio wave beam come from a base station directly is lowered, said mobile station directing a radio wave beam to a direction from which another radio wave beam comes, said another radio wave beam with a directional antenna having the best receiving quality among other radio wave beams arriving at said mobile station from said base station, and said mobile station requesting allocation of a time slot for said another radio wave beam; and
said base station allocating said time slot such that said time slot is different from timing at which other base stations radiate radio wave beams which may cause interference with said another radio wave beam.

9. A communication control method used in a cellular mobile communication system in which each base station can radiate radio wave beams to a plurality of directions and each base station communicates with mobile stations by using the same frequency by radiating radio wave beams to the mobile stations, said method comprising the steps of:
receiving at a control station from a base station, radiation timing information for radiating a radio wave beam in a direction;
controlling based on said received radiation timing information, first timing at which a base station radiates a first radio wave beam such that said first timing is different from second timing at which another base station radiates a second radio wave beam which may cause interference with said first radio wave beam;
sending updated radiation timing information from the control station to the base station;
a mobile station receiving a signal by a first radio wave beam from a direction of a base station,
said mobile station directing a radio wave beam with a directional antenna to a direction from which a second radio wave beam comes, said second radio wave beam being radiated by said base station and arriving at said mobile station;
said mobile station requesting allocation of a time slot for said second radio wave beam; said base station allocating said time slot such that said time slot is different from timing at which other base stations radiate radio wave beams which may cause interference with said second radio wave beam; and
said mobile station combining a received signal by said first radio wave beam and a received signal by said second radio wave beam.

10. A communication control method used in a cellular mobile communication system in which each base station can radiate radio wave beams to a plurality of directions and each base station communicates with mobile stations by using the same frequency by radiating radio wave beams to the mobile stations, said method comprising the steps of:
receiving at a control station from a base station, radiation timing information for radiating a radio wave beam in a direction;
controlling based on said received radiation timing information, first timing at which a base station radiates a first radio wave beam such that said first timing is different from second timing at which another base station radiates a second radio wave beam which may cause interference with said first radio wave beam;
sending updated radiation timing information from the control station to the base station;
when a received level in a base station for a signal by a radio wave beam come from direction of a mobile station is lowered, said base station directing a radio wave beam to a direction from which another radio wave beam comes to keep a path, said another radio wave beam having the best receiving quality among other radio wave beams arriving at said base station from said mobile station.

11. A communication control method used in a cellular mobile communication system in which each base station can radiate radio wave beams to a plurality of directions and each base station communicates with mobile stations by using the same frequency by radiating radio wave beams to the mobile stations, said method comprising the steps of:
receiving at a control station from a base station, radiation timing information for radiating a radio wave beam in a direction;
controlling based on said received radiation timing information, first timing at which a base station radiates a first radio wave beam such that said first timing is different from second timing at which another base station radiates a second radio wave beam which may cause interference with said first radio wave beam;
sending updated radiation timing information from the control station to the base station;
when a received level in a mobile station for a signal by a radio wave beam come from a base station directly is lowered, said mobile station selecting another radio wave beam, said another radio wave beam having the best receiving quality among other radio wave beams arriving at said mobile station from said base station, and said mobile station requesting allocation of a time slot for said another radio wave beam; and
said base station allocating said time slot such that said time slot is different from timing at which other base stations radiate radio wave beams which may cause interference with said another radio wave beam.

12. A communication control method used in a cellular mobile communication system in which each base station can radiate radio wave beams to a plurality of directions and each base station communicates with mobile stations by using the same frequency by radiating radio wave beams to the mobile stations, said method comprising the steps of:
- receiving at a control station from a base station, radiation timing information for radiating a radio wave beam in a direction;
- controlling based on said received radiation timing information, first timing at which a base station radiates a first radio wave beam such that said first timing is different from second timing at which another base station radiates a second radio wave beam which may cause interference with said first radio wave beam;
- sending updated radiation timing information from the control station to the base station;
- a mobile station receiving a signal by a first radio wave beam from a direction of a base station,
- said mobile station requesting allocation of a time slot for a second radio wave beam, said second radio wave beam being radiated by said base station and arriving at said mobile station; said base station allocating said time slot such that said time slot is different from timing at which other base stations radiate radio wave beams which may cause interference with said second radio wave beam; and
- said mobile station combining a received signal by said first radio wave beam and a received signal by said second radio wave beam.

13. A communication control apparatus in a cellular mobile communication system which controls communication between each base station and a mobile station in which each base station can radiate radio wave beams to a plurality of directions and each base station communicates with mobile stations by using the same frequency by radiating a radio wave beam to the mobile station, said apparatus comprising:
- a receiving part for receiving at a control station from a base station, radiation timing information for radiating a radio wave beam in a direction;
- a timing control part for controlling first timing at which a base station radiates a first radio wave beam such that said first timing is different from second timing at which another base station radiates a second radio wave beam which may cause interference with said first radio wave beam, and
- a sending part for sending updated radiation timing information from the control station to the base station.

14. A mobile station in a cellular mobile communication system in which each base station radiates a radio wave beam to a mobile station and each base station communicates with a mobile station by using the same frequency, said mobile station comprising:
- a part for, when a received level in a mobile station for a signal by a radio wave beam coming from a base station directly is lowered, directing a radio wave beam with a directional antenna, to a direction from which another radio wave beam comes, and requesting allocation of a time slot for said another radio wave beam, said another radio wave beam having the best receiving quality among other radio wave beams arriving at said mobile station from said base station;
- wherein said base station allocates said time slot such that said time slot is different from timing at which other base stations radiate radio wave beams which may cause interference with said another radio wave beam.

15. A mobile station in a cellular mobile communication system in which each base station radiates a radio wave beam to a mobile station and each base station communicates with a mobile station by using the same frequency, said mobile station comprising:
- a part for receiving a signal by a first radio wave beam from a direction of a base station, and directing a radio wave beam with a directional antenna to a direction from which a second radio wave beam comes, said second radio wave beam being radiated by said base station and arriving at said mobile station;
- a part for requesting allocation of a time slot for said second radio wave beam;
- a part for combining a received signal by said first radio wave beam and a received signal by said second radio wave beam after said base station allocates said time slot such that said time slot is different from timing at which other base stations radiate radio wave beams which may cause interference with said second radio wave beam.

* * * * *